J. N. SPARKS.
HULLING MACHINE.
APPLICATION FILED MAY 19, 1919.
1,335,465.
Patented Mar. 30, 1920.
2 SHEETS—SHEET 1.
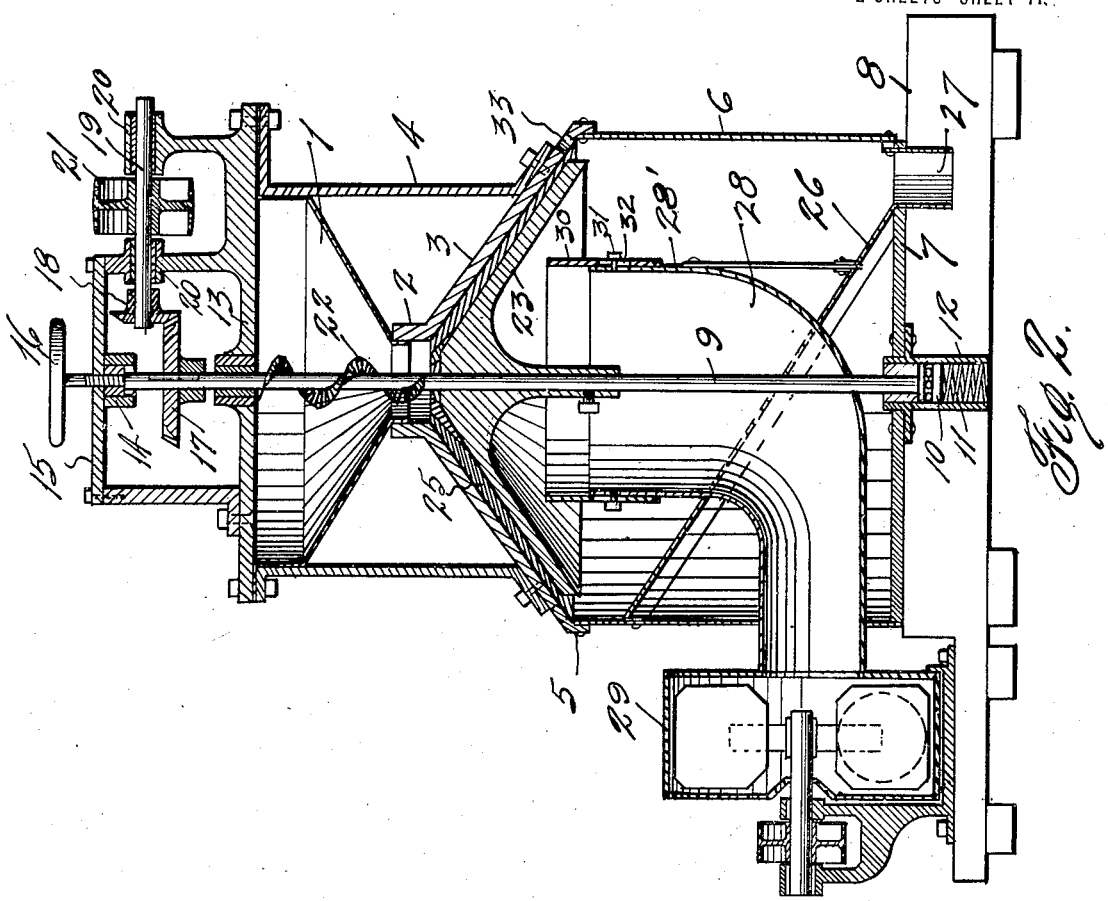
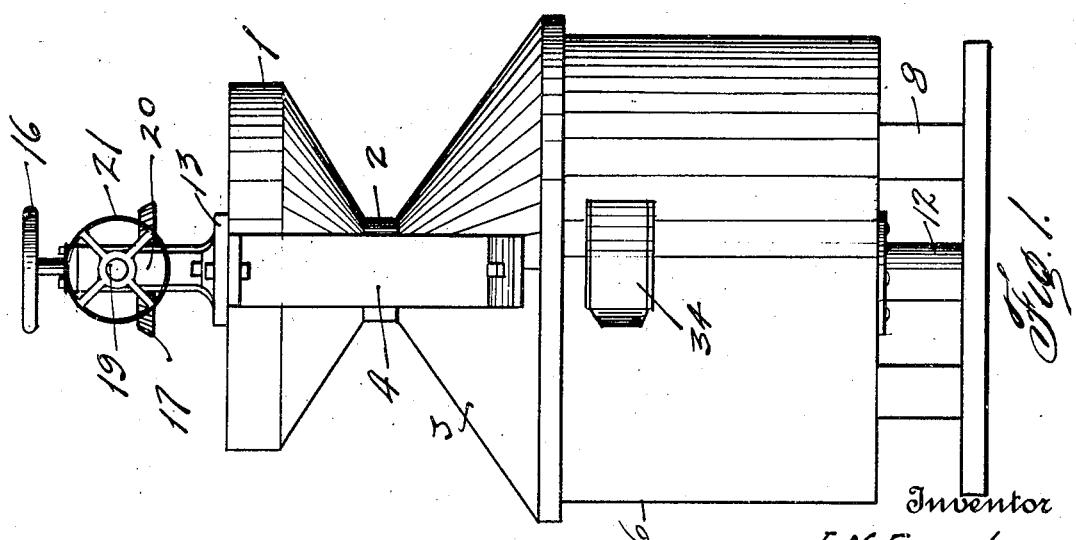
Inventor
J. N. Sparks,
By Jack A. Ashley
Attorney

J. N. SPARKS.
HULLING MACHINE.
APPLICATION FILED MAY 19, 1919.

1,335,465.

Patented Mar. 30, 1920.
2 SHEETS—SHEET 2.

Inventor
J. N. Sparks
By Jack A. Ashley
Attorney

UNITED STATES PATENT OFFICE.

JAMES N. SPARKS, OF DALLAS, TEXAS.

HULLING-MACHINE.

1,335,465.  Specification of Letters Patent.  Patented Mar. 30, 1920.

Application filed May 19, 1919. Serial No. 298,031.

*To all whom it may concern:*

Be it known that I, JAMES N. SPARKS, a citizen of the United States, residing at Dallas, in the county of Dallas and State of Texas, have invented certain new and useful Improvements in Hulling-Machines, of which the following is a specification.

This invention has particular relation to hullers for nuts.

The aim of the invention is to hull all sizes of nuts such as peanuts. In the hullers now in common use many small nuts pass through without being shelled. Another result sought is to separate the hulls and trash from the shelled nuts so that a clean product is had.

In carrying out the invention hulling or shelling members are provided in converging relation so that the nuts are free to enter therebetween and are acted a according to their size, the smallest being hulled nearer the point of discharge from the members. An air suction is created with sufficient force to draw the hulls and trash from the discharge of the hulling members and divert the same into a separate channel from the nuts or kernels.

Figure 3:
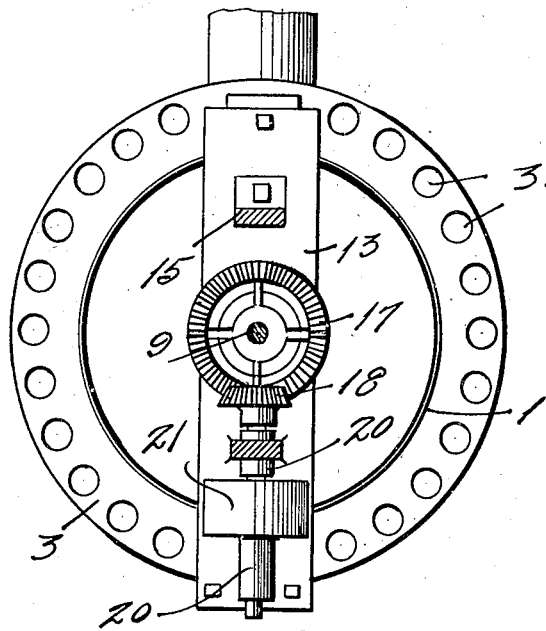
Figure 5:
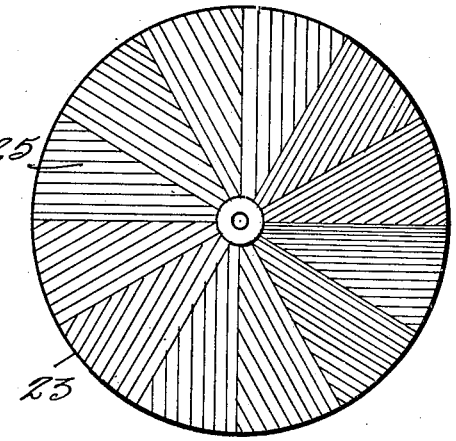
Figure 4:
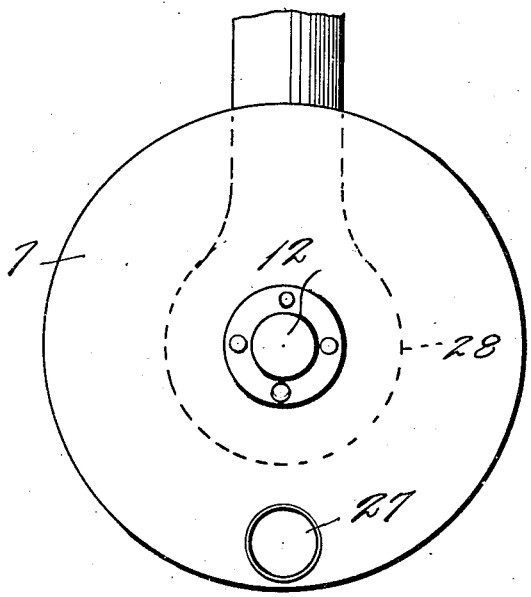

This invention will be more readily understood from a reading of the following specification and by reference to the accompanying drawings, in which an example of the invention is shown and wherein:

Figure 1 is an elevation of a huller constructed in accordance with my invention, Fig. 2 is a vertical sectional view of the same, Fig. 3 is a plan view, Fig. 4 is an under side view, and Fig. 5 is a plan view of one of the hulling cones or burs.

In the drawings the numeral 1 designates a hopper having its lower end fitting into a collar 2 on the top of a conical member 3. The hopper is supported by uprights 4 mounted on the member 3. The member 3 has a depending marginal flange 5 within which the upper end of a cylindrical casing 6, is fastened. The casing has a false bottom 7 resting on seats 8.

A vertical shaft 9 extend through casing and hopper and has its lower end supported on a ball-bearing ring 10 mounted on a coiled spring 11 in box 12 depending from the center of the bottom 7. The shaft extends up through a cross plate 13 mounted on top of the hopper and supported by the uprights 4. The upper end of the shaft engages in a socket 14 on a bracket 15 mounted on the cross plate. A hand screw 16 threaded down into the socket bears on the shaft and in conjunction with the spring 11 is used to adjust the shaft vertically.

A bevel gear 17 is made fast on the shaft and is driven by a bevel pinion 18 fixed on the end of a shaft 19 supported in bearing boxes 20 mounted on the plate 13 and driven by a pulley 21. Within the hopper the shaft carries a spiral agitator 22 and the shaft is revolved so as to cause the agitator to feed the nuts downward through the collar 2.

A conical bur 23 is fastened on the shaft 9 by a set screw 24. The bur 23 fits up under the member 3 and the adjacent surfaces 25 are serrated in sectors with the serration at variant angles, as is shown in Fig. 5. The bur 23 is made so that its surface 25 will converge downward toward the surface 25 of the member 3.

It will be seen when the nuts are delivered between the hulling surfaces, the larger nuts will be hulled nearer the top of the bur, while the small nuts will roll down the surfaces and there be hulled. All sizes of nuts are handled and small nuts cannot escape without being shelled. By turning the screw 16 the bur 23 is adjusted toward or from the member 3 as desired. Also by reason of the spring the bur will yield downward when a piece of metal or obstruction enters between the hulling surfaces.

Within the casing an inclined partition 26 is arranged to receive the nuts or kernels falling from the bur and guide them to an outlet 27 from which they may be suitably conveyed. An air conduit elbow 28 has its vertical member 28¹ enlarged and terminating under the bur. The shaft 9 extends through the elbow. The horizontal member of the elbow is reduced in diameter and extends through the side of the casing to a suction creating fan 29.

A collar 30 surrounds the upper end of the member 28¹ and is adjustable vertically by reason of slots 32 receiving screws 31. The fan creates a suction of considerable force, the air being taken in through perforations 33 in the member 3 which overhangs the bur 23. The air blast will divert the shells and trash drawn over the collar 30 as they are lighter in weight than the kernels.

It may be necessary to adjust the collar 30 to avoid diverting the nuts into the elbow as the nuts hulled at one time may vary in weight from those handled the next time. The operation is rapid as the nuts, such as peanuts, are fed into the hopper 1 and hulled between the member 3 and the bur 23; the hulled or shelled nuts falling onto the partition 26 and the shells and trash being diverted into the elbow 28 by the air blast. The hulls and kernels are segregated and the product is clean. A door 34 is provided in the casing for gaining access to the set screw 24 and screws 31.

What I claim, is:

1. In a nut huller, a hopper, a conical bur member arranged beneath the hopper and decreasing in diameter upwardly and provided at its upper end with an opening in communication with the hopper, a casing connected with the conical bur member near its lower outer edge and depending downwardly beyond the same, there being an annular set of spaced air inlet apertures disposed adjacent the lower outer edge of the bur member, a conical bur decreasing in diameter upwardly and operating within the conical bur member, means to drive the conical bur, outlet means connected with the lower portion of the casing, a section conduit having its inlet portion arranged substantially concentric within the casing with its upper end projecting into the lower end of the conical bur at a point above the lower edge thereof, and a section device connected with the suction conduit.

2. In a nut huller, a conical bur member increasing in diameter downwardly, a casing connected with the lower large end of the conical bur member and projecting downwardly beyond the same, there being an annular set of air inlet apertures arranged adjacent the lower outer edge of the bur member, a conical bur decreasing in diameter downwardly operating within the conical bur member, a suction conduit having a substantially vertical intake portion arranged concentrically within the casing with its upper end projecting into the lower end of the conical bur and terminating in a plane above the inlet apertures, a suction device connected with the conduit, and outlet means connected with the lower portion of the casing, and means for feeding material between the bur member and bur.

3. In a nut huller, a hopper, a conical bur member under the hopper, a casing under the member, a vertical shaft extending through the casing and hopper, a bur cone mounted on the shaft, the member and cone having serrated surfaces converging toward each other, the member having a plurality of air admitting openings disposed around its edge, a conduit elbow in the casing under the cone, a fan connected with the elbow for creating a suction therethrough; an adjustable collar for varying the height of the elbow, and an inclined partition in the casing.

4. In a nut huller, a conical bur member increasing in diameter downwardly, a casing connected with the lower large end of the bur member, there being a series of surrounding air inlet apertures adjacent the lower end of the bur member, a conical bur operating within the bur member and increasing in diameter downwardly, a suction conduit having a substantially vertical portion arranged concentrically within the casing with its upper end disposed beneath the conical bur, a vertically adjustable sleeve carried by this upper end and adapted to project into the conical bur, a suction device connected with the conduit, means for withdrawing material from the lower portion of the casing, and means for supplying material between the bur member and bur.

In testimony whereof I affix my signature.

JAMES N. SPARKS.